(12) United States Patent
Sojka et al.

(10) Patent No.: US 8,458,253 B1
(45) Date of Patent: Jun. 4, 2013

(54) ENTERPRISE CONFERENCING WITH DUAL MIXING

(75) Inventors: Myron P. Sojka, Logan, IA (US);
Stephen D. McCoy, Omaha, NE (US);
Srinivas Maganti, Andhra Pradesh (IN)

(73) Assignee: West Corporation, Omaha, NE (US)

( * ) Notice: Subject to any disclaimer, the term of this patent is extended or adjusted under 35 U.S.C. 154(b) by 1283 days.

(21) Appl. No.: 12/039,380

(22) Filed: Feb. 28, 2008

(51) Int. Cl.
*G06F 15/173* (2006.01)
*G06F 15/77* (2006.01)
*H04L 12/66* (2006.01)
*H04M 3/42* (2006.01)
*H04M 7/00* (2006.01)

(52) U.S. Cl.
USPC ........... 709/204; 370/352; 370/353; 370/354; 370/356; 709/220; 709/222; 709/228; 709/235; 709/206; 379/220.01; 379/221.02

(58) Field of Classification Search
None
See application file for complete search history.

(56) References Cited

U.S. PATENT DOCUMENTS

| | | | |
|---|---|---|---|
| 6,584,076 B1 * | 6/2003 | Aravamudan et al. | 370/260 |
| 6,876,734 B1 * | 4/2005 | Summers et al. | 379/202.01 |
| 2003/0145054 A1 * | 7/2003 | Dyke | 709/205 |
| 2004/0062210 A1 | 4/2004 | Genter et al. | |
| 2006/0239249 A1 * | 10/2006 | Banner et al. | 370/352 |
| 2006/0245574 A1 * | 11/2006 | Phelps et al. | 379/229 |
| 2006/0270447 A1 * | 11/2006 | Everson et al. | 455/552.1 |
| 2007/0133575 A1 * | 6/2007 | Cai et al. | 370/401 |
| 2007/0294425 A1 * | 12/2007 | Sobti et al. | 709/231 |
| 2008/0317238 A1 * | 12/2008 | Cai et al. | 379/220.01 |

* cited by examiner

*Primary Examiner* — Asad M. Nawaz
*Assistant Examiner* — Jason Harley

(57) ABSTRACT

A system, method, and computer readable medium comprising instructions for establishing a conference call comprising sending a first SIP INVITE message from a Media Gateway to an Application Server, sending a second SIP INVITE message to a first Media Server, establishing a session between the Media Gateway and the first Media Server, sending a third SIP INVITE message from the Application Server to a Conference Controller, allocating resources related to the conference call by the Conference Controller on a second Media Server, requesting by the Conference Controller for the Application Server to move data related to establishing the conference call from the first Media Server to the second Media Server, sending a fourth SIP INVITE message by the Application Server to the second Media Server and sending a SIP RE-INVITE message by the Application Server to the Media Gateway, and establishing an RTP session between the Media Gateway and the second Media Server thereby establishing the conference call.

19 Claims, 5 Drawing Sheets

ENTERPRISE CONFERENCING WITH DUAL MIXING

BACKGROUND OF THE INVENTION

The present invention is a system, method, and computer readable medium for providing audio/video/data conferencing to an enterprise that has both internal and external entities joining a conference.

Currently, many service providers offer conferencing services to enterprises that support callers both internal and external to the enterprise. Typically, these services are provided by conferencing servers located at centralized data centers which are often co-resident with Public Switched Telephone Network (PSTN) ingress/egress points.

When a conference is setup, individual calls from the enterprise are backhauled to the data center through either a public or private, voice or data network. The problem with this approach is that backhauling all of the individual call legs takes a significant amount of bandwidth, and thus adds cost to the service provider which is often, in turn, passed onto the enterprise customer.

Therefore, what is needed to overcome the aforementioned limitation, is a system in which the enterprise legs of a conference can be combined before being backhauled to the conference service and a method for managing a conference in such a system. What is also required is the ability to maintain enterprise originated conference calls at the enterprise premise and bridge external participants as needed to the enterprise from other conference service providers.

SUMMARY OF THE INVENTION

The present invention, accordingly, eliminates the need for each leg of a conference to require its own, individual backhaul entity to the conferencing data center. This is accomplished by establishing equipment at the enterprise entity that allows each conferencing leg exiting the Public Branch Exchange (PBX) or similar entity at the enterprise to be mixed and converted to a consolidated, Integrated Protocol (IP) stream for processing over an IP Network. Certain entities of the Conferencing Service Provider's network are repeated at the enterprise premise to perform this consolidation. A Media Gateway and/or a Media Server is used at the enterprise site to:
  mix all conferencing legs leaving the enterprise;
  convert PBX multi-media conference signaling formats to
    a consolidated IP stream for communication with the
    Conferencing Service Provider;
  serve as proxy server for interfacing with Conferencing
    Service Provider Application Server and local Media
    Servers.
Media Servers would reside at the enterprise premise for the hosting of enterprise conferences locally to the enterprise location. These units would also serve as Voice over IP (VoIP) interfaces with the Media Servers located at the Conferencing Service Provider's site as conference participants external to the enterprise join the conference.

By having a Media Gateway and Media Servers at the enterprise premise, it allows conferences established from the enterprise to be served at the enterprise with no backhaul connectivity required to the Conferencing Service Provider. As external conference participants join the conference, a single IP connection over the Wide Area Network (WAN) and interfaced with the Conferencing Service Provider for both signaling and bearer traffic would be used to join these external conference participants to the local enterprise conference.

As additional conference calls are required to be established and served from the enterprise, the same IP connection can be used, therefore eliminating the need for multiple connections to be established back to the Conferencing Data Center for processing and thus eliminating the additional cost associated with providing and maintaining these connections.

In one embodiment of the present disclosure, a method for establishing a conference call comprises sending a first SIP INVITE message from a Media Gateway to an Application Server, associating a request with Media Server resources at the Application Server, sending a second SIP INVITE message to a first Media Server based on the associating, establishing a Real Time Transport Protocol (RTP) session between the Media Gateway and the first Media Server, gathering entered data at the first Media Server, sending the gathered data to the Application Server, sending a third SIP INVITE message from the Application Server to a Conference Controller based on the gathered data, allocating resources related to the conference call by the Conference Controller on a second Media Server, requesting by the Conference Controller for the Application Server to move data related to establishing the conference call from the first Media Server to the second Media Server, sending a fourth SIP INVITE message by the Application Server to the second Media Server and sending a SIP RE-INVITE message by the Application Server to the Media Gateway, receiving an acknowledgement by the Application Sever that the second Media Server and the Media Gateway are ready to establish the conference call; and establishing an RTP session between the Media Gateway and the second Media Server thereby establishing the conference call.

In one embodiment of the present disclosure, a system for establishing a conference call comprises a Media Gateway at a data center that sends a first SIP INVITE message initiated by a PSTN caller to an Application Server at the data center, a first Media Server at the data center that receives a second SIP INVITE message from the Application Server and establishes a Real Time Transport Protocol (RTP) session between the Media Gateway and the first Media Server, wherein the Application Server sends a first message to the first Media Server to gather data entered by the Caller at the Media Gateway for establishing the conference, wherein the first Media Server sends the entered data to the Application Server, a second Media Server at the data center, a third Media Server at an enterprise, and a Conference Controller at the data center that: receives a third SIP INVITE message from the Application Server based on the entered data, allocates resources related to the conference call on the second Media Server, requests the Application Server to move data related to establishing the conference call from the first Media Server to the second Media Server, sends a first message to the second Media Server and creates a conference at the at the second Media Server, sends a second message to the third Media Server and bridges the third Media Server with the conference at the at the second Media Server, and sends a third message to the Application Server to move the call from the first Media Server to the second Media Server, wherein the Application Server sends a second message to the Media Gateway and sends a third message to the second Media Server which establishes an RTP session between the Media Gateway and the second Media Server resulting in the PSTN Caller in a conference on the second Media Server bridged with an Enterprise Caller on the third Media Sever.

In one embodiment of the present disclosure a computer readable medium comprises instructions for sending a first message from a Media Gateway to an Application Server, sending a second message to a first Media Server based on the first message, establishing a session between the Media Gateway and the first Media Server, gathering entered data at the first Media Server, sending the gathered data to the Application Server, sending a third message from the Application Server to a Conference Controller based on the gathered data, moving data by the Application Server to move data related to establishing the conference call from the first Media Server to the second Media Server, sending a fourth message by the Application Server to the second Media Server and sending a SIP RE-INVITE message by the Application Server to the Media Gateway, and establishing an RTP session between the Media Gateway and the second Media Server thereby establishing the conference call.

DETAILED DESCRIPTION OF THE INVENTION

In accordance with the principles of the invention, Enterprise Systems looking to reduce the cost of maintaining expensive PSTN connectivity for conference call activity, establish premise equipment (Media Gateway and Media Servers) to allow connectivity directly to the Conferencing Service Provider via the Wide Area Network (WAN). This allows the Enterprise System to bypass PSTN connectivity for all conference call activity and ultimately reduce the cost of maintaining multiple PSTN connections for this use.

Figure 1:
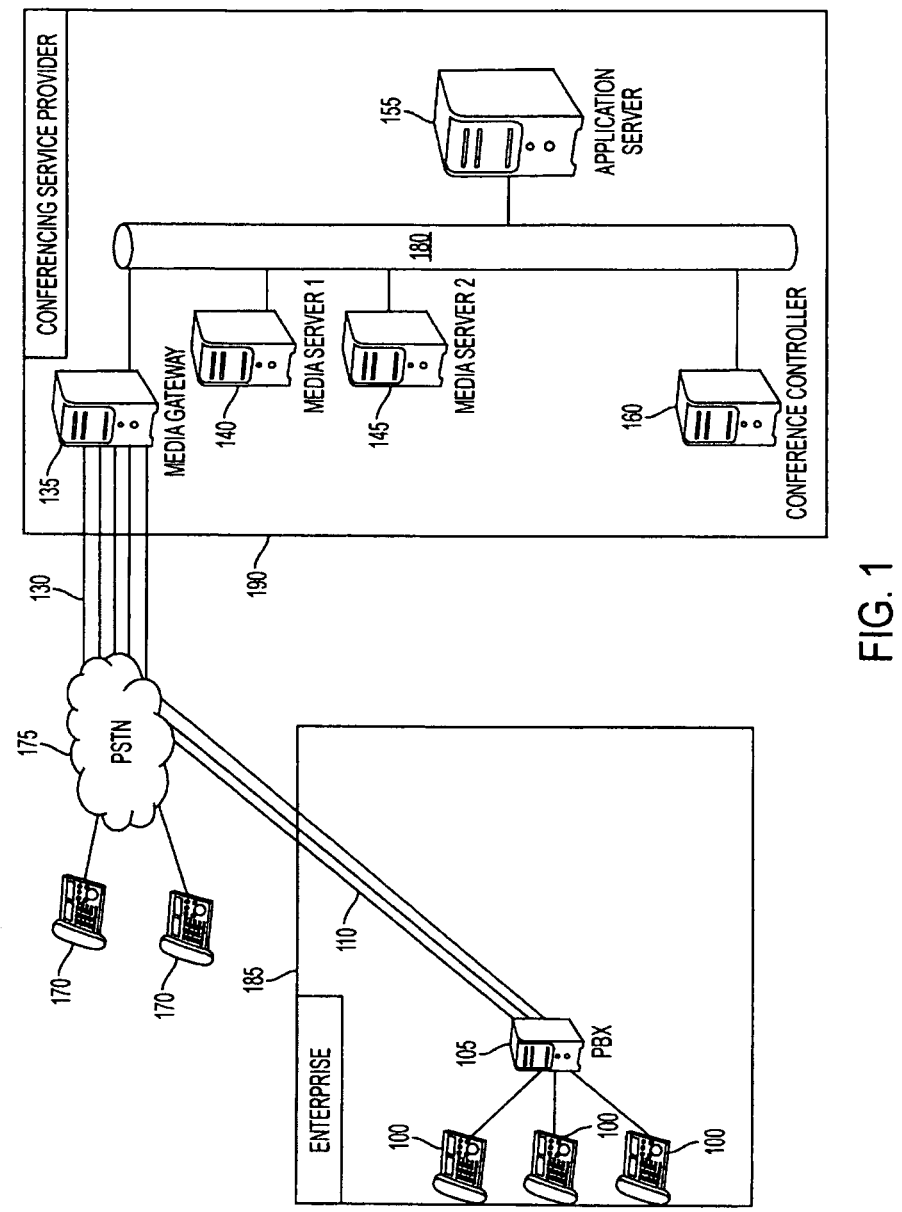
FIG. 1 depicts a typical configuration of how users on an Enterprise System currently interface back to a Conferencing Service Provider via the PSTN Network for establishing or joining a pre-existing conference call in accordance with a preferred embodiment of the present invention.

With reference now to the figures and in particular with reference to FIG. 1, a diagram of a Enterprise Telephony System interfaced to a Conferencing Service Provider is depicted in accordance with a preferred embodiment of the present invention. It should be noted that each device represented can have multiple instances within the architecture. FIG. 1 depicts only one instance of each entity for simplification purposes. Enterprise 185 represents any size business or organization requiring conferencing services from an external conferencing service provider. Enterprise 185 is represented herein as containing multiple Callers 100 connected to a Public Branch Exchange 105 or similar entity known in the art for serving business telecommunication needs. Callers 100 can be any multitude of entities within the Enterprise 185 and is beyond the scope of this invention. FIG. 1 represents multiple Caller 100 entities to clearly depict the problem of PSTN connectivity required as multiple callers exist in an Enterprise. "Caller", as referenced in this embodiment, will represent either a conference host or conference participant. Conference host is defined as a user who is establishing and hosting a conference call. Conference participant is one of possible many participants that will join a conference that another "Caller" is hosting. "Callers" can reside at the enterprise or at the PSTN and can be either conference hosts or conference participants.

Connectivity between the Caller 100 and PBX 105 can be in any format or medium supported by the PBX. For clarity purposes, this invention assumes that this connectivity is a typical Time Division Multiplexed (TDM) circuit-switched connection. The PBX serves as the switching entity and telecommunications application server within the Enterprise 185. It routes calls as required between internal callers within the enterprise and also routes internal callers to external interfaces outside of the Enterprise 185 via the PSTN 175.

The PBX 105 interfaces with the PSTN 175 via multiple Circuit-Switched Connections 110. These connections are typical DS1/E1 interfaces that are well known in the art. These connections are usually leased from the PSTN service provider. The amount of connections required is defined by the number of users being hosted on the PBX and the capability of the PBX to share these connections amongst multiple users.

Continuing to refer to FIG. 1, Callers 170 represent conference host or conference participants external to the Enterprise 185. For the purpose of this embodiment, Caller 170 represents any caller needing to host or join a conference call via the PSTN 175 hosted by the Conferencing Service Provider 190. As is illustrated in the diagram, connectivity between the PSTN 175 and the entry point into the Conferencing Service Provider's network is supplied by Circuit-Switched Connections 130. These connections can be of many varieties and are only limited by the interface connectivity method supported by the Conferencing Service Provider's Media Gateway 135 and the PSTN 175. For the purpose of this invention, it should be assumed that this connectivity is DS1/DS3 (North American) or E1/E3 (International) based. It should also be assumed that PSTN 175 does not need to reside in the same geographical region as the Conferencing Service Provider. The Enterprise 185 and PSTN 175 could reside internationally with the Conferencing Service Provider residing locally.

The Conferencing Service Provider 190 is an entity that provides conferencing services to enterprises or other business entities. For the purposes of this embodiment, it is made up of multiple components all networked together to perform the service. The entities of this platform include the Media Gateway 135, Media Servers 140 and 145, an Application Server 155, a Conference Controller 160, and a networking backbone 180 that links all components together.

Media Gateway 135 is the device that interfaces directly with the PSTN and supplies the conversion of the circuit-switched conference call to an Internet Protocol (IP) stream and vice versa for processing within the conferencing system. The Media Gateway uses the Session Initiated Protocol (SIP) or similar IP control-plane protocol for session establishment and maintenance with the other components in the system. It uses the Real Time Transport Protocol (RTP) or similar bearer-plane protocol for establishing bearer-plane Voice over IP (VoIP) connections in the system. Media Servers 140/145 in the Conferencing System 190 are used to host the conference calls and supply all features associate with conferencing. These systems are well know in the art and can be comprised of common forms of processing medium capable of running commercially available software suites providing SIP conferencing or similar IP telephony based software packages.

The Media Servers 140/145 are assigned to specific conferences by the combination of the Application Server 155 and the Conference Controller 160. The Application Server 155 is the heart of the conferencing system and provides all resource management within the system and works in conjunction with the Conference Controller in assigning media server resources within the conferencing system. It receives SIP calls from the Media Gateway 135 and establishes conference sessions via RTP between the Media Gateway 135 and Media Servers 140/145. The Conferencing Controller serves to setup the conferences within the system and then maintain and control the call flow and conference business logic by communicating with the Media Servers 140/145 and Application Server 155.

FIG. 1 represents the current connectivity that exists between the Enterprise System 185 and the Conferencing Service Provider 190. Circuit-switched connectivity 110 can be costly for an Enterprise System to maintain and drives the need for alternative methods for multiple conference call traffic to the external Conferencing Service Provider.

Figure 2:
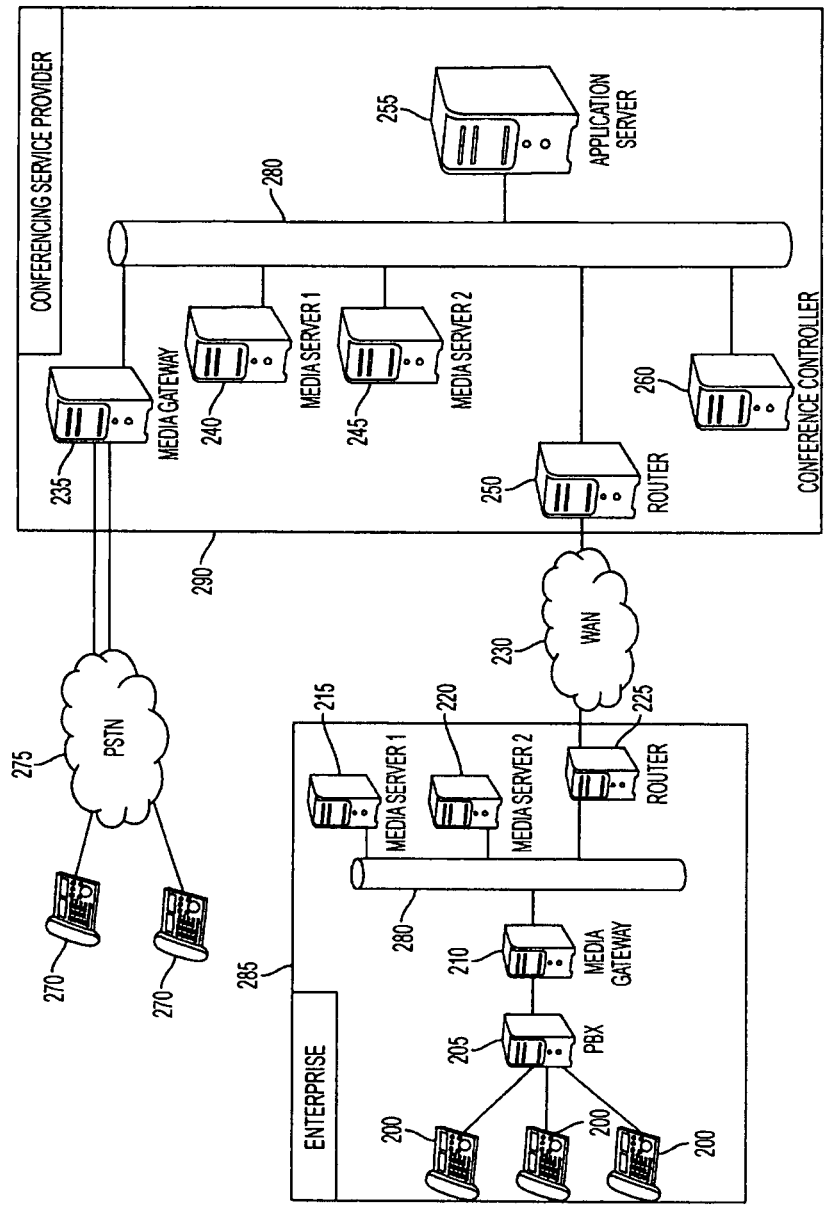
FIG. 2 depicts the addition of Conferencing Media Gateway and Media Servers at the Enterprise site and the required physical connectivity to the WAN in accordance with a preferred embodiment of the present invention.

With reference now to FIG. 2, a recommended conference call routing mechanism is depicted in accordance with a preferred embodiment of the present invention. FIG. 2 shows the addition of a Media Gateway 210, IP Backbone Network 280, Media Server-1 215, Media Server-2 220, and Router 225. These devices are added at the Enterprise System 285 premise for maintaining local conference call establishment and Internet Protocol routing of conference calls over the Wide Area Network 230 to the Conferencing Service Provider 290. These devices allow the "bridging" or mixing of conference callers external to the enterprise with conference callers within the enterprise.

In the depicted figure and with particular reference to Enterprise System 285, Callers 200 are interfaced to PBX 205 and are either conference hosts or conference participants with respect to the current invention. PBX 205 hosts these callers and performs telephony routing and call maintenance. Multiple circuit-switched connections leaving PBX 205 interface with a Media Gateway 210. The Media Gateway 210 converts the circuit switched connections into IP based sessions and communicates directly with the Application Server 255 at the Conferencing Service Provider 290 via Routers 225 and 250 and the Wide Area Network (WAN) 230. The Application Server 255 is the main interface server in the Conferencing Service Provider 290 network. It serves as a proxy server to all of the other SIP entities in the network and maintains location based data of all Media Server entities both internal and external to the network. It also performs the associated routing necessary to establish and maintain the conferences. Conferencing Controller 260 is the resource manager within the network. It maintains information on available Media Server resources and allocates these resources as requested. It communicates via the Application Server amongst all hosted Media Servers at the Conferencing Service Provider 290, other Conferencing Service Providers—as required, and external Media Servers to the Conferencing Service Provider.

Figure 3:
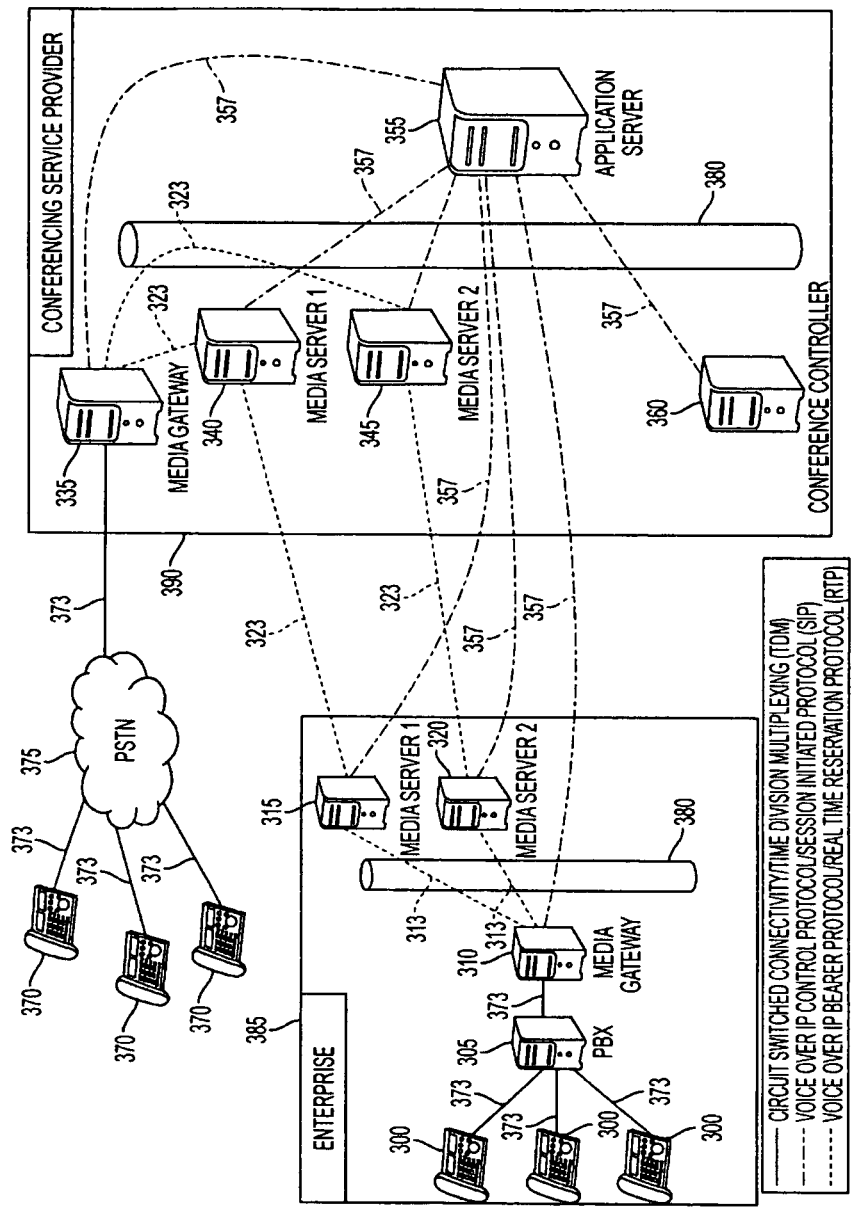
FIG. 3 depicts a further refinement of FIG. 2 by showing the logical connectivity of the embodiment and software protocols used to establish and maintain conference calls in accordance with a preferred embodiment of the present invention.

With reference now to FIG. 3, a logical connectivity diagram is depicted in accordance with a preferred embodiment of the present invention. As discussed in FIG. 2, Callers 300 communicate with the PBX in a format that is supported by that PBX. These Interfaces 373 are beyond the scope of this invention. For simplification purposes, it will be assumed that these Interfaces 373 are circuit-switched TDM interfaces. It is also assumed that Interface 373 exists between the PBX 305 and the Media Gateway 310. This interface is driven by the supported media interface cards supported by the Media Gateway 310 and is beyond the scope of this invention. As Callers 300 either establish or attempt to join conferences, Media Server 310 communicates with Application Server 355. At this point in the invention, all communication is based on IP Telephony protocols. These protocols can be any IP Telephony protocols that support session establishment/management as well as Real-Time Voice over IP. For the purposes of this invention, it will be assumed that all session based IP telephony is SIP based and all Voice over IP is RTP.

Figure 4:
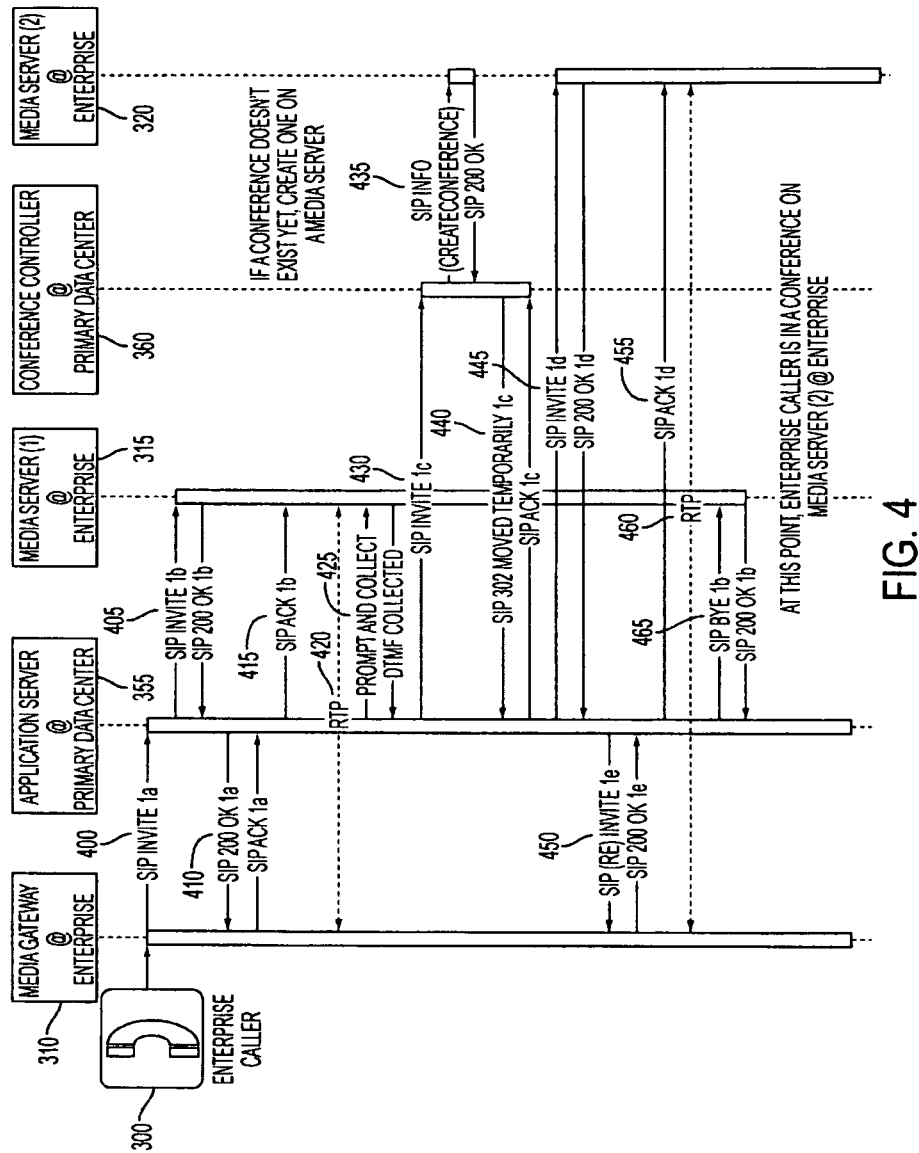
FIG. 4 depicts actual Session Initiated Protocol (SIP)/Real Time Transport Protocol (RTP) message flows required for both the Enterprise caller to establish or join a conference call in accordance with a preferred embodiment of the present invention.

Continuing to reference FIG. 3 along with referencing FIG. 4 as a message flow reference, and assuming a conference call is being attempted to be setup by one of Callers 300, a SIP INVITE 400 message would be exchanged between the Media Gateway 310 and the Application Server 355 for request for this conference host to establish a conference call. Application Server 355 associates request with Media Server resources at enterprise premise and sends a SIP INVITE 405 to Media Server 1 315 for establishment of RTP session with Media Gateway 310. SIP acknowledgments are returned to both Media Gateway 310 and Media Server 1 315 requesting RTP negotiation between the two. RTP Session 420 is established between Media Gateway 310 and Media Server 1 315. Once RTP linkage is established, a PROMPT AND COLLECT 425 is sent to Media Server 1 315 to gather entered data by Caller 300 for establishing the conference. Media Server 1 315 returns this data to Application Server 355 via a DTMF COLLECTED 425 message.

After the Application Server 355 has this data, it sends a SIP INVITE 430 to Conference Controller 360 to determine if the conference is already established. Since Caller 300 is establishing a new conference, Conference Controller confirms this based on information received from Caller 300 and allocates resources on Media Server 2 320 via a SIP INFO (Create Conference) 435 message for creating the new conference. Media Server 2 responds with a SIP 200 OK to acknowledge and confirm receipt. Conference Controller 360 then sends a SIP 302 MOVED TEMPORARILY 440 to Application Server 355 to inform Application Sever to move call from Media Server 1 to Media Server 2. Application Server 355 acknowledges receipt of this with a SIP ACK. Application Server 355 Then sends SIP RE-INVITE 440 and SIP INVITE 445 to Media Gateway 310 and Media Server 2 320 respectively.

Both of these entities respond with SIP 200 OK messages to let Application Sever know that transaction was completed appropriately. After Application Sever has acknowledgement that both Media Server 2 and Media Gateway are ready to establish call, a SIP ACK 455 message is returned to Media Server 2 to complete the SIP transaction. At this point, an RTP session is established between Media Gateway 310 and media Server 2 320. Finally, a SIP BYE Message 465 is sent from Application Server to Media Sever 1 315 to release resources originally reserved for this call. Media Sever 1 responds to Application Server with SIP OK to confirm cleanup. At this point, Enterprise Caller 300 is in a conference on Media Server 2 320 at the Enterprise 385.

Figure 5:
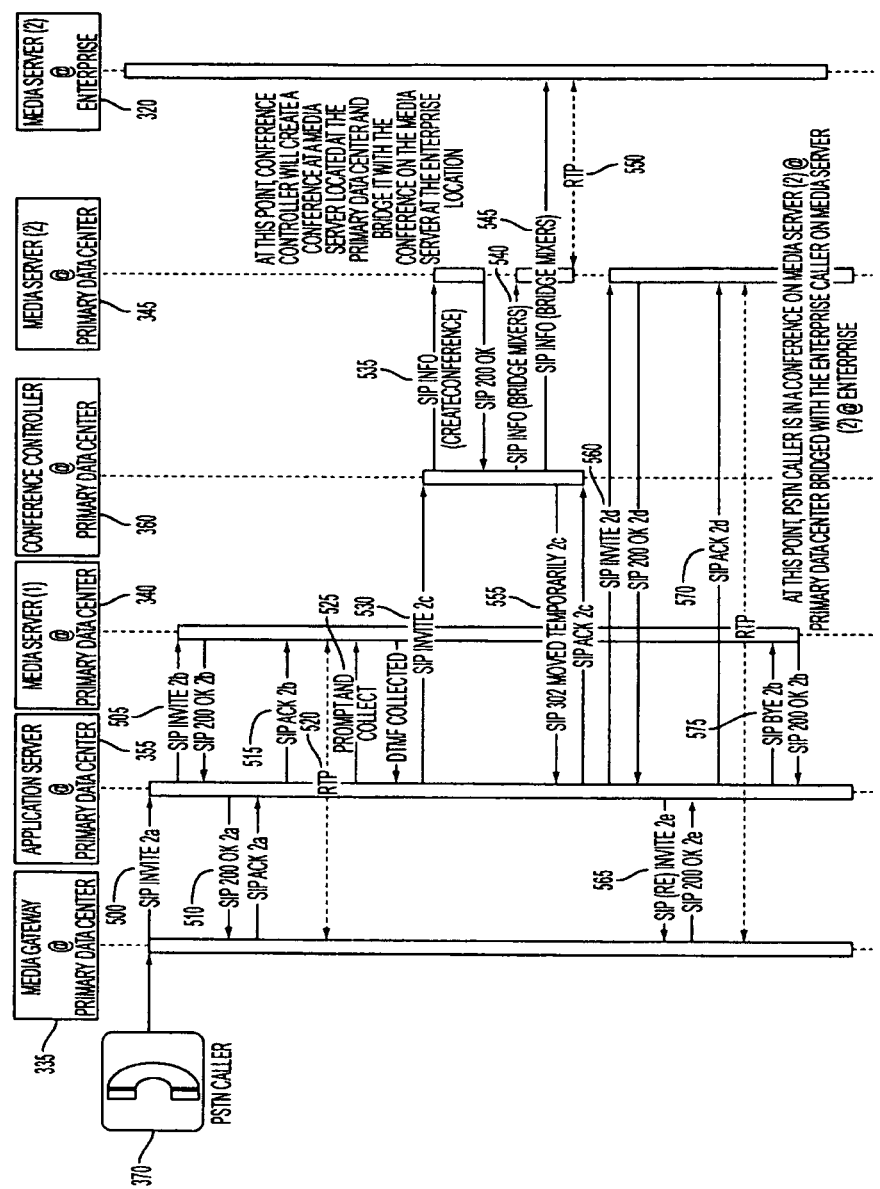
FIG. 5 depicts actual Session Initiated Protocol (SIP)/RTP message flows required for the external PSTN caller to join a conference call at the enterprise premise in accordance with a preferred embodiment of the present invention.

Continuing to reference FIG. 3 and now referring to FIG. 5 as message flow reference, PSTN Caller 370 is attempting to join a conference hosted at the Enterprise 385. PSTN Caller 370 enters the appropriate numbers to access the conference call. The PSTN 375, once receiving this dial string, routes the call to the Media Gateway 335 at the Conferencing Service Provider 390. The Media Gateway performs the appropriate circuit to packet translation on the incoming data and sends a SIP INVITE 500 message to the Application Server 355. Application Server 355 associates request with Media Server resources at Conferencing Service Provider premise and sends a SIP INVITE 405 to Media Server 1 340 for establishment of RTP session with Media Gateway 335. SIP acknowledgments are returned to both Media Gateway 335 and Media Server 1 340 requesting RTP negotiation between the two. RTP Session 520 is established between Media Gateway 335 and Media Server 1 340. Once RTP linkage is established, a PROMPT AND COLLECT 525 is sent to Media Server 1 340 to gather entered data by Caller 370 for establishing the conference. Media Server 1 340 returns this data to Application Server 355 via a DTMF COLLECTED 525 message.

After the Application Server 355 has this data, it sends a SIP INVITE 530 to Conference Controller 360 to determine if the conference is already established. Conference Controller determines that this conference is already established and is being hosted on an enterprise server. Conference Controller sends a SIP INFO (Create Conference) 535 to Media Server 2 345 for establishing Conference Service Provider leg of call. Media Server 2 responds with SIP 200 OK message confirming setup. At this point in the session, the Conference Controller 360 sends a SIP INFO (Bridge Mixers) 540 message to Media Server 2 345 and a SIP INFO (Bridge Mixers) 545 to Media Server 2 320 at enterprise site. At this point, Conference Controller 360 creates a conference at the Media Sever located at the Conferencing Service Provider Site and bridges it with the conference on the Media Server at the Enterprise location. Conference Controller 360 then sends a SIP 302 MOVED TEMPORARILY 555 to Application Server 355 to inform Application Sever to move call from Media Server 1 to Media Server 2. Application Server 355 acknowledges receipt of this with a SIP ACK. Application Server 355 Then sends SIP RE-INVITE 565 and SIP INVITE 560 to Media Gateway 335 and Media Server 2 345 respectively. Both of these entities respond with SIP 200 OK messages to let Application Sever know that transaction was completed appropriately.

After Application Sever has acknowledgement that both Media Server 2 and Media Gateway are ready to establish call, a SIP ACK 570 message is returned to Media Server 2 to complete the SIP transaction. At this point, an RTP session is established between Media Gateway 335 and Media Server 2 345. Finally, a SIP BYE Message 575 is sent from Application Server to Media Sever 1 340 to release resources originally reserved for this call. Media Sever 1 responds to Application Server with SIP OK to confirm cleanup. At this point, PSTN Caller 370 is in a conference on Media Server 2 345 at Conferencing Service Provider 390 bridged with the Enterprise Caller on Media Sever 2 320 at Enterprise 385.

The description of the present invention has been presented for purposes of illustration and description, but is not intended to be exhaustive or limited to the invention in the form disclosed. Many modifications and variations will be apparent to those of ordinary skill in the art without departing form the scope of the present invention. For example, although the processes and apparatus of present invention are illustrated with voice conferencing and SIP/RTP IP Telephony messaging, the processes and apparatus of the present invention may be implemented in other types of networks and protocols. For example, the present invention may be illustrated in various application-level protocols such as SIP/RTP protocols or network-level protocols such as MPLS (Multi Protocol Label Switching)/RSVP (Resource Reservation Protocol) protocols. Further, although the Application Server and Conference Controller are depicted as separate components using SIP as the communication protocol between them, in one embodiment, the Application Server has functionality for both IVR and conference control operations. Also, although SIP INFO messages, such as SIP INFO (540), are used to bridge the conferences on the media servers at the enterprise and primary data center, in one embodiment at least one SIP INVITE message can be used to setup a call between the two conferences on the two media servers.

What is claimed is:

1. A method for establishing a conference call, comprising: sending a first SIP INVITE message from a Media Gateway to an Application Server; associating a request with Media Server resources at the Application Server; sending a second SIP INVITE message to a first Media Server based on the associating; establishing a Real Time Transport Protocol (RTP) session between the Media Gateway and the first Media Server; gathering entered data at the first Media Server; sending the gathered data to the Application Server; sending a third SIP INVITE message from the Application Server to a Conference Controller based on the gathered data; allocating resources related to the conference call by the Conference Controller on a second Media Server; requesting by the Conference Controller for the Application Server to move data related to establishing the conference call from the first Media Server to the second Media Server; sending a fourth SIP INVITE message by the Application Server to the second Media Server and sending a SIP RE-INVITE message by the Application Server to the Media Gateway; receiving an acknowledgement by the Application Sever that the second Media Server and the Media Gateway are ready to establish the conference call; and establishing an RTP session between the Media Gateway and the second Media Server thereby establishing the conference call, wherein one or both of the Media Gateway and the Application Server are configured to mix all conferencing legs leaving an enterprise;

after establishing the RTP session between the Media Gateway and the first Media Server, sending a PROMPT AND COLLECT message from the Application Server to the first Media Server to gather entered data by a Caller at the Media Gateway to establish the conference.

2. The method of claim 1, further comprising: sending, by the Application Server, a SIP acknowledgment to the Media Gateway and a SIP acknowledgment to the first Media Server to request an RTP negotiation between the Media Gateway and the first Media Server.

3. The method of claim 1, further comprising: returning the entered data by the first Media Server to the Application Server via a DTMF COLLECTED message.

4. The method of claim 1, further comprising: determining whether the conference is already established by the sending of the third SIP INVITE message from the Application Server to the Conference Controller based on the gathered data.

5. The method of claim 1, further comprising: establishing a new conference by the Conference Controller based on information received from a Caller at the Media Gateway and allocating resources on the second Media Server via a SIP INFO (Create Conference) message to create the new conference.

6. The method of claim 5, further comprising: sending a SIP OK message by the second Media Server acknowledging the SIP INFO (Create Conference) message.

7. The method of claim 1, further comprising: sending, by the Conference Controller, a SIP MOVED TEMPORARILY message to the Application Server to request, by the Conference Controller, the Application Server to move the data related to establishing the conference call from the first Media Server to the second Media Server.

8. The method of claim 7, further comprising: sending a SIP ACK message from the Application Server to the Conferencing Controller acknowledging receipt of the SIP MOVED TEMPORARILY message.

9. The method of claim 1, further comprising: sending a SIP OK message from the second Media Server to the Application Server based on the fourth SIP INVITE message, and sending a SIP OK message from the Media Gateway to the Application Server based on the SIP RE-INVITE message.

10. The method of claim 9, further comprising: sending a SIP ACK message by the Application Server to the second Media Server to complete the SIP transaction and to establish the RTP session between the Media Gateway and the second Media Server.

11. The method of claim 1, further comprising: sending a SIP BYE Message from the Application Server to the first Media Sever to release resources originally reserved for the call.

12. The method of claim 11, further comprising: sending a SIP OK message from the first Media Sever to the Application Server to confirm the release of the resources originally reserved for the call.

13. The method of claim 12, further comprising: establishing the conference call for a caller on the second Media Server.

14. The method of claim 1, wherein the Media Gateway, the first Media Server, and the second Media Server are located at an enterprise.

15. The method of claim 1, wherein the Application Server and the Conference Controller are located at a Primary Data Center.

16. A system for establishing a conference call, comprising: a Media Gateway at a data center configured to send a first SIP INVITE message initiated by a PSTN caller to an Application Server at the data center; a first Media Server at the data center configured to receive a second SIP INVITE message from the Application Server and establish a Real Time Transport Protocol (RTP) session between the Media Gateway and the first Media Server, wherein the Application Server is configured to send a first message to the first Media Server to gather data entered by the Caller at the Media Gateway to establish the conference, and the first Media Server is configured to send the entered data to the Application Server;

a second Media Server at the data center; a third Media Server at an enterprise; and a Conference Controller at the data center configured to: receive a third SIP INVITE message from the Application Server based on the entered data, allocate resources related to the conference call on the second Media Server, request the Application Server to move data related to establishing the conference call from the first Media Server to the second Media Server, send a first message to the second Media Server and create a conference at the at the second Media Server, send a second message to the third Media Server and bridge the third Media Server with the conference at the at the second Media Server, and send a third message to the Application Server to move the call from the first Media Server to the second Media Server, wherein the Application Server is configured to send a second message to the Media Gateway and send a third message to the second Media Server that establishes an RTP session between the Media Gateway and the second Media Server resulting in the PSTN Caller in a conference on the second Media Server bridged with an Enterprise Caller on the third Media Server, and one or both of the Media Gateway and the Application Server are configured to mix all conferencing legs leaving an enterprise;

after establishing the RTP session between the Media Gateway and the first Media Server, sending a PROMPT AND COLLECT message from the Application Server to the first Media Server to gather entered data by a Caller at the Media Gateway to establish the conference.

17. A non-transitory computer readable medium comprising instructions for: sending a first message from a Media Gateway to an Application Server; sending a second message to a first Media Server based on the first message; establishing a session between the Media Gateway and the first Media Server; gathering entered data at the first Media Server; sending the gathered data to the Application Server; sending a third message from the Application Server to a Conference Controller based on the gathered data; moving data by the Application Server to move data related to establishing the conference call from the first Media Server to the second Media Server; sending a fourth message by the Application Server to the second Media Server and sending a SIP RE-INVITE message by the Application Server to the Media Gateway; and establishing an RTP session between the Media Gateway and the second Media Server thereby establishing the conference call, wherein one or both of the Media Gateway and the Application Server are configured to mix all conferencing legs leaving an enterprise;

after establishing the RTP session between the Media Gateway and the first Media Server, sending a PROMPT AND COLLECT message from the Application Server to the first Media Server to gather entered data by a Caller at the Media Gateway to establish the conference.

18. The non-transitory computer readable medium of claim 17, further comprising instructions to allocate resources related to the conference call by the Conference Controller on a second Media Server after sending the third message.

19. The non-transitory computer readable medium of claim 17, further comprising instructions to receive an acknowledgement by the Application Sever that the second Media Server and the Media Gateway are ready to establish the conference call.

* * * * *